United States Patent Office.

JOHN H. CRANE AND CHARLES W. CRANE, OF CHARLESTOWN, MASSACHUSETTS.

Letters Patent No. 90,505, dated May 25, 1869.

PROCESS OF MAKING ORNAMENTAL SIGNS, &c.

The Schedule referred to in these Letters Patent and making part of the same.

*To all whom it may concern:*

Be it known that we, JOHN H. CRANE and CHARLES W. CRANE, both of Charlestown, in the county of Middlesex, and State of Massachusetts, have invented an Improvement in the Manufacture of Signs, &c.; and we do hereby declare that the following is a description of our invention sufficient to enable those skilled in the act to practise it.

This invention relates to securing upon one side of a transparent material, preferably glass, other materials which are made to adhere to the glass, and which, by their form and contrasted colors, exhibit letters, figures, and ornamental and other forms and outlines; said invention being intended for the production of ornamental signs, advertising-placards, &c.

In the practice of our invention we coat one surface of the glass with a pigment of any desired color, which is mixed with water or with other suitable fluid which will evaporate and leave the pigment uniformly coated upon the glass.

This coating must be so mixed that it will not adhere tenaciously to the glass, like an oil, paint, or a varnish; still, it should have a slight cohesion of its own particles together and to the glass, merely to prevent the coating from falling off when dry and under the manipulation to which it is subjected; but the cohesion must not be such as will prevent easy removal of the coating under the rubbing action of a stiff brush, applied with some force.

Turpentine will generally supply sufficient cementitious matter to the pigment, if used for the fluid with which the pigment is mixed, or if water is used, a slight size of glue or gum-arabic, or other equivalent matter, may be added.

Suppose the object to be made is to be a business-sign with an inscription, then we proceed as follows:

Over the dry pigment, made and applied as before described, we place, where we desire to show letters, stencil-plates in proper position and arrangement, and then, with a stiff brush, remove the pigment where exposed through the stencil-plates. Then the whole surface of the glass on which the pigment rests, which surface is to be the back side of the sign or show-card, is coated with varnish or oil, which permeates the pigment and causes it to adhere tenaciously to the glass, and resists moisture. Dry pigments, of any desired color, are then dusted upon the surface of the glass where the opaque pigment has been removed, and the oil or varnish on said surfaces, not being dry, causes the powder so dusted upon the glass to adhere thereto.

Other materials than pigment in dry powder may be made to adhere similarly to the glass, to give any desired appearance of letters, figures, &c., such, for example, as gold, silver, and other metallic leaf or foil, or ornamental paper, or bronze-powder or pearl-dust, &c.

The materials applied to the clear surfaces of the glass, to show letters, figures, &c., in contrast with the body-color, may, if desired, be protected on the back by a coat or coats of oil, paint, varnish, &c.

After the dry pigment of the body-coat upon the glass has been in part removed, to show the forms of letters, figures, &c., and has been oiled or varnished, and if the oil or varnish has been allowed to dry, the clear glass spaces may be coated with colored paints, or they may be again coated with oil or varnish, upon which second coat, before it becomes dry, powders or other suitable materials may be placed; and when, by the drying of the oil or varnish, they are made to adhere to the glass, they may be protected on the back by paint, oil, or varnish.

Prior to our invention, signs, show-cards, &c., have been made upon glass by making the outlines of the letters, figures, &c., by a brush, with oil-paint, and then filling, also with a brush, around and up to the outline first traced with oil-color, after which the clear glass surfaces left, have, when the body color of oil-paint has become dry, been filled by oil-paints, or have been gilded, silvered, and powdered by first sizing the clear glass surfaces.

But by use of the slightly adhering body-color, applied all over the surface of the glass, the process of obtaining the shapes of the letters, figures, &c., is so much facilitated as to greatly cheapen the cost of signs, &c., the quality of the work done being fully equal to that in which an oil body-color is used.

We claim the process described for the manufacture of signs, &c., and as a new manufacture, signs, &c., produced by the described process.

JOHN H. CRANE.
CHARLES W. CRANE.

Witnesses:
J. B. CROSBY,
FRANCIS GOULD.